United States Patent [19]

Togashi et al.

[11] 4,443,062
[45] Apr. 17, 1984

[54] MULTI-LAYER DISPLAY DEVICE WITH NONACTIVE DISPLAY ELEMENT GROUPS

[75] Inventors: Seigo Togashi; Akira Tsuzuki; Hiro Fujita, all of Tokorozawa, Japan

[73] Assignee: Citizen Watch Company Limited, Tokyo, Japan

[21] Appl. No.: 187,671

[22] Filed: Sep. 16, 1980

[30] Foreign Application Priority Data

Sep. 18, 1979 [JP] Japan ................. 54-118719
Sep. 18, 1979 [JP] Japan ................. 55-118720

[51] Int. Cl.[3] .............................................. G02F 1/133
[52] U.S. Cl. ...................................... 350/332; 350/333; 350/335
[58] Field of Search ............... 350/333, 334, 335, 377, 350/390, 391, 392, 332; 340/765, 784, 785

[56] References Cited

U.S. PATENT DOCUMENTS

| 3,738,099 | 6/1973 | Tanaka ................. 340/765 X |
| 3,751,137 | 8/1973 | Fritzgibbons et al. ........ 350/343 |
| 3,771,855 | 11/1973 | Burns ................. 350/343 |
| 3,848,247 | 11/1974 | Sherr ................. 350/333 X |
| 3,981,560 | 9/1976 | Heymen et al. ........ 340/785 X |
| 4,142,182 | 2/1979 | Kmetz ................. 350/333 |

FOREIGN PATENT DOCUMENTS 1332984 10/1973 United Kingdom ........ 350/335
2041615 8/1980 United Kingdom ........ 340/785

OTHER PUBLICATIONS

Buchoff, "Conductive Elastomers Make Small, Flexible Contacts", *Electronics*, Sep. 19, 1974, pp. 122-125.

*Primary Examiner*—John K. Corbin
*Assistant Examiner*—David Lewis
*Attorney, Agent, or Firm*—Jordan and Hamburg

[57] ABSTRACT

In a multi-layer display device such as a liquid crystal display, each of a plurality of sets of display elements is defined by a corresponding common electrode and a plurality of segment electrodes. Segment electrodes of sets of display elements which will not be activated simultaneously are connected together, with at least one of these sets being maintained in a deactivated state by means of a special drive signal applied to the corresponding common electrode. The level of time-sharing which must be utilized for driving the various common electrodes, for a given number of external connections to the segment electrodes, can thereby be reduced, or the overall number of connections made to the display device can be substantially reduced.

13 Claims, 27 Drawing Figures

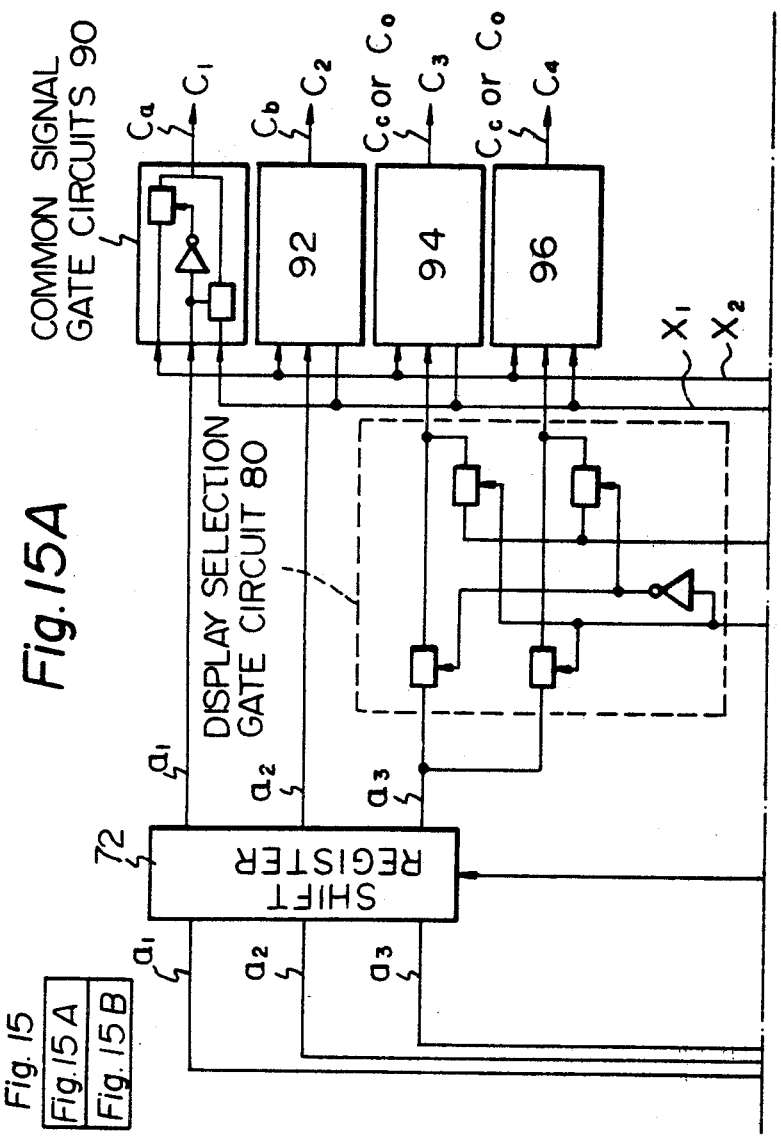

|  | $S_1$ | $S_2$ | $S_3$ |  |
|---|---|---|---|---|
| $C_1$ | $m_{11}$ | $m_{21}$ | $m_{31}$ | --- |
| $C_2$ | $m_{12}$ | $m_{22}$ | $m_{32}$ | --- |
| $C_3$ | $m_{13}$ | $m_{23}$ | $m_{33}$ | --- |

4,443,062

MULTI-LAYER DISPLAY DEVICE WITH NONACTIVE DISPLAY ELEMENT GROUPS

BACKGROUND OF THE INVENTION

The present invention is directed toward a display device for an electronic instrument such as an electronic timepiece, and in particular to a liquid crystal display or transmission-type electrochromic display device which is of multi-layer construction. The present invention comprises a novel method of interconnection of electrodes in such a device in conjunction with means for driving particular ones of the electrodes such that activation of the corresponding display elements is either enabled or disenabled. The invention enables a higher density of display elements to be provided in such a display device, by reducing the number of external connections to the device required to apply drive signals to the electrodes thereof, for a given degree of display effectiveness in terms of such factors as overall display contrast.

At the present time, electro-optical display devices such as liquid crystal display cells are widely utilized in various types of electronic instruments, electronic calculators, timepieces, etc. Such display devices provide the advantages of only a low level of drive voltage being required and of having low power consumption, while providing a long working life with high reliability. There is at present an increasing demand for an increased density of display elements in such devices, in order to provide more complex display patterns in greater variety, in accordance with the increasing complexity of modern electronic instruments. One method of increasing the display density of a display device such as a liquid crystal cell is to utilize a time-sharing method of driving the device electrodes, to thereby reduce the number of electrical connections which must be made to the device. This is because of the fact that the limit on display element density is in general determined by the number of connections which must be made to the cell electrodes, i.e. the connections which must be made between the display device and the source of drive voltages for the display (generally an integrated circuit). Another method of increasing the maximum display element density is to utilize a multi-layer structure, i.e. to vertically stack two or more display cells such that activated display elements of the lower cell are visible through the upper cell. Such a method, however, does not in itself reduce the number of cell electrode external connections which are required. As is described hereinafter, increasing the level of time-sharing of the drive signals applied to the cell electrodes results in a decrease in display effectiveness. This is because the level of cell contrast is lowered, and the effective viewing angle of the display is reduced. Hitherto, attempts to increase the density of display elements of display cells such as liquid crystal display cells have been limited by the factors mentioned above.

With the present invention, these disadvantages of prior art display devices are substantially reduced. This is achieved by making it possible for electrodes of particular groups of display segments, which are not required to be activated simultaneously, to be connected in common. This will be made more clear by the description of preferred embodiments given hereinafter. The present invention therefore enables liquid crystal cells having a multi-layer structure to be produced, whereby a significant increase in the maximum display element density is achieved.

SUMMARY OF THE INVENTION

The present invention comprises an improved configuration for a multi-layer display device, such as a liquid crystal or transmissive-type electrochromic display device, in conjunction with an improved system for driving the electrodes of such a display device, whereby the number of external connections to the device for supplying drive signals to the electrodes is significantly reduced. The present invention is in particular directed toward a multi-layer display device in which certain groups or sets of display elements on one layer thereof will never be activated (i.e. made visible) simultaneously with at least one group of display elements of another layer. Such a condition is commonly met with in a multi-layer display device, in which activation of certain display patterns on different layers simultaneously would result in obscuring of these patterns by one another. Such a display device comprises a plurality of groups of display elements on each layer of the device, each driven by a separate common electrode in conjunction with a plurality of segment electrodes. The invention is characterized in that at least some of the segment electrodes in one of the display layers, corresponding to one group of display elements on that layer, are electrically connected to segment electrodes in at least one other layer, corresponding to another group of display elements. These two groups of display elements are not required to ever be activated simulatneously. Means are provided for applying a special drive signal to the common electrode of one of these display element groups (i.e. the group which is not currently required to be activated) whereby that display element group is held in a non-activated condition irrespective of the signals which are applied to the segment electrodes of both of these display element groups. As a result, it is possible with the present invention to either reduce the number of external connections necessary for the display device electrodes, or to reduce the degree of time-sharing of signals applied to the electrodes (i.e. the duty cycle at which the cell electrodes are driven), for a given number of external connections. The present invention therefore enables a display device having a high degree of display density to be produced having a reduced number of connections thereto, so that the size and cost of an electronic device or timepiece incorporating such a display can be substantially reduced, by comparison with display systems of the prior art.

DESCRIPTION OF THE PREFERRED EMBODIMENTS

Figure 1A:
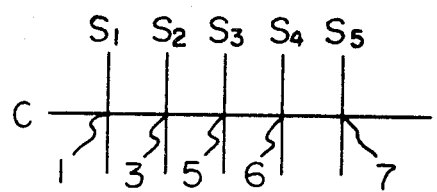
FIGS. 1A and 1B are diagrams illustrating arrays of display cell electrodes for static drive and dynamic drive systems respectively.

Referring first to FIG. 1A, an illustration is shown therein of an array of electrodes for a display cell, for use with what is generally referred to as a "static" drive system. A common electrode, held at a predetermined potential, is denoted by the letter C. A set of segment electrodes are denoted as S1, S2, S3, S4 and S5, and the potential currently applied to each of these segment electrodes determines a state of activation or inactivation of a display segment define by the intersection of that segment electrode with the common electrode C. (The term "display segment" will be used herein with the meaning of a single independently selectable element of a display pattern). Such display segments are denoted by the numerals 1, 3, 5, 6 and 7. In the case of a liquid crystal display cell, a display segment is acti- vated when the potential difference between the segment electrode and common electrode corresponding to that display segment goes above a predetermined threshold level, i.e. when a sufficiently high excitation voltage is applied to the electrode intersection defining that display segment. An electrode array such as that of FIG. 1A has the characteristic that only a single display segment can be defined by each segment electrode.

Figure 1B:
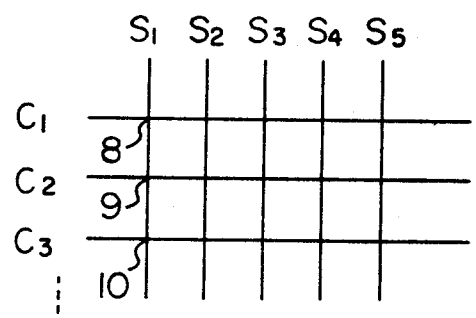

FIG. 1B shows an electrode array for a display cell utilizing what is generally referred to as a dynamic drive system. In this case, a plurality of common electrodes C1, C2, C3 etc. are provided, and are successively driven in a time-sharing manner, while the data applied to each of the segment electrodes S1, S2, etc. is switched in synchronism with the drive signals applied to the common electrodes. Thus, when a drive voltage is applied to common electrode C1 such as to enable activation of for example a display segment 8, a potential defining whether segment 8 is to be activated or not is applied to segment electrode S1. It should be noted that the term "segment electrode" is used herein to refer to one or more segment-defining electrodes each of which is connected in common to a single drive signal terminal. In the array of FIG. 1B, for example, the segment electrode denoted as S1 serves to activate three or more display segments, denoted as 8, 9 and 10. Thus, with a dynamic type of drive system, a plurality of display segments can be defined by means of a single segment electrode, i.e. by means of a single terminal connected to an external source of a segment drive signal. (Such a terminal will be referred to hereinafter as a drive terminal). If the number of drive terminals of a display is designated as n, and the total number of display segments is designated as M, then for a static type of display drive, the number of drive terminals necessary for the display is given by the formula: $n = N + 1$. If the number of common electrodes is defined as N, then for a dynamic type of drive system, the number of drive terminals required is given by the formula: $n = N/M + M$. It can thus be seen that use of a dynamic drive system enables a considerable reduction in the number of drive terminals required for a display cell, and that this reduction is enhanced as the number of common electrodes is increased. However, an increase in the number of common electrodes has the disadvantage that the display effectiveness, in terms of display contrast and viewing angle, is lowered. This is due to the fact that, with a time-sharing drive system, each display segment which is to be activated is actually only activated periodically during a time interval which grows increasingly shorter as the number of common electrodes is increased. In other words, the duty cycle for which each segment is driven into activation is reduced, so that the effective excitation voltage applied to each display segment may be considered as being reduced.

Figure 2:
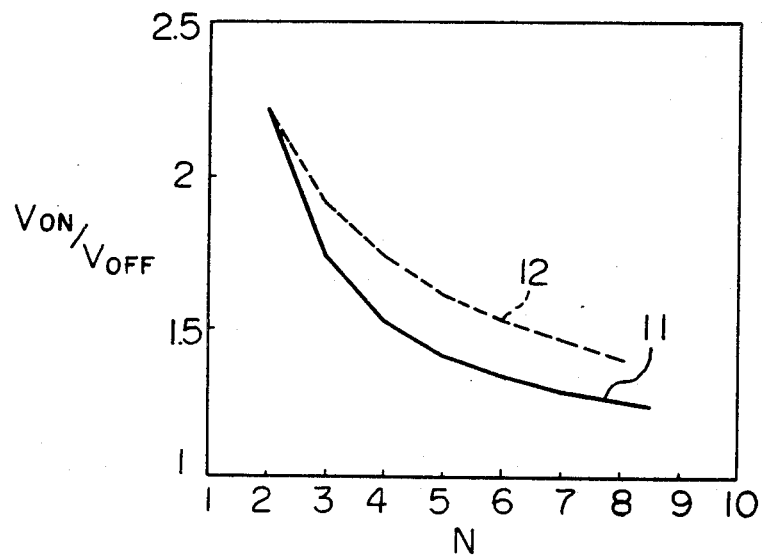
FIG. 2 is a graph illustrating the relationship between the ratio of excitation voltage to non-excitation voltage, $V_{on}/V_{off}$ for a dynamic drive display system and the number of common electrodes of the display device.

FIG. 2 is a graph which shows the relationship between the number of common electrodes N of a dynamic drive display cell and the ratio $V_{ON}/V_{OFF}$. Here, $V_{ON}$ designates the effective excitation voltage applied to a display segment in order to activate that segment. $V_{OFF}$ designates the effective non-activation voltage applied between the electrodes of a display segment, i.e. the level of voltage applied thereto which should ensure that the segment is completely non-activated. If each display segment is completely activated by a sufficiently high value of $V_{ON}$, and is completely non-activated by a sufficiently low value of $V_{OFF}$, in other words if the ratio $V_{ON}/V_{OFF}$ is maximized, then display contrast is maximized. However in practice, with a time-sharing electrode drive system, it is not possible to maximize this ratio, which decreases as the number of common electrodes is increased, i.e. as the duty cycle of each common electrode drive signal is decreased. In FIG. 2, the solid line characteristic 11 represents the variation for what is known as the "½ bias" method of driving a liquid crystal display cell, while the broken line characteristic applies to the "⅓ bias" method. Thus, in order to assure sufficient display effectiveness, in terms of display contrast etc, it is generally necessary to limit the number of common electrodes to 2 or 3. This imposes a limit upon the degree of drive terminal number reduction which can be achieved by a time-sharing drive system.

Figure 3:
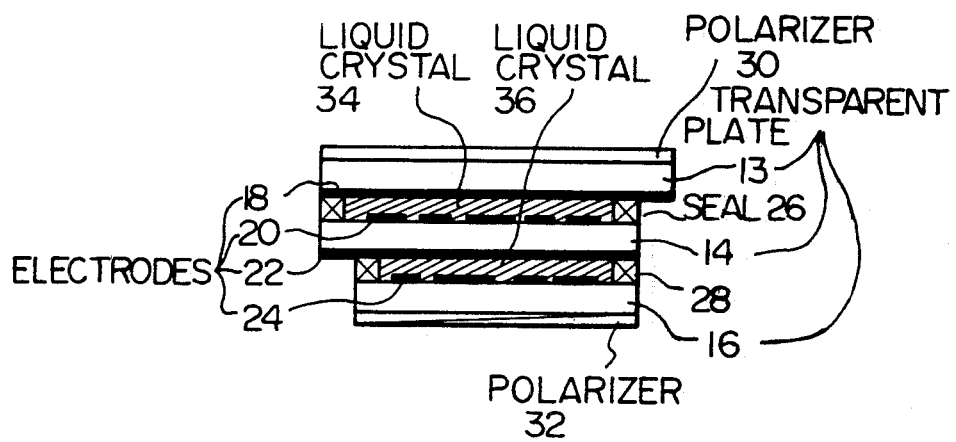
FIG. 3 is a cross-sectional view in elevation of a two-layer liquid crystal display device according to the prior art.

Another method of increasing the display segment density is to use a multi-layer structure. This enables the number of possible display patterns to be increased, and facilitates connection between the drive terminals of the display and the various display segments, as well as other advantages such as reduced size overall. FIG. 3 is a cross-sectional view in elevation of a two-layer liquid crystal display device. The device comprises transparent plates 13, 14 and 16, polarizer plates 30 and 32, electrodes 18, 20, 22 and 24, liquid crystal layers 34 and 36, and sealing means 26 and 28 for sealing the liquid crystal material between transparent plates 13, 14 and 16. In this example, leads from the electrodes to drive terminals are taken out from only the lower surface of transparent plates 13, and 14, however the upper surfaces of plates 14 and 16 may also be utilized for this purpose. Multi-layer liquid crystal display cell structures such as that shown in FIG. 3 are known in the prior art, and while providing some advantages over a single-layer structure in terms of compactness and enabling a larger variety of patterns to be displayed, such a conventional type of cell cannot provide a substantial reduction in the number of drive terminals required. This is because the number of common electrodes in each of the layers cannot be greater than 2 or 3, for the reasons described above, and because from the aspect of the segment electrode connections, such a display cell corresponds to two separate cells. However, it is a feature of such a multi-layer display cell that certain display patterns, i.e. certain sets of display segments, on different layers, cannot be activated simultaneously. The present invention utilizes this fact in order to reduce the total number of drive terminals required for such a multi-layer display device.

Figure 4A:
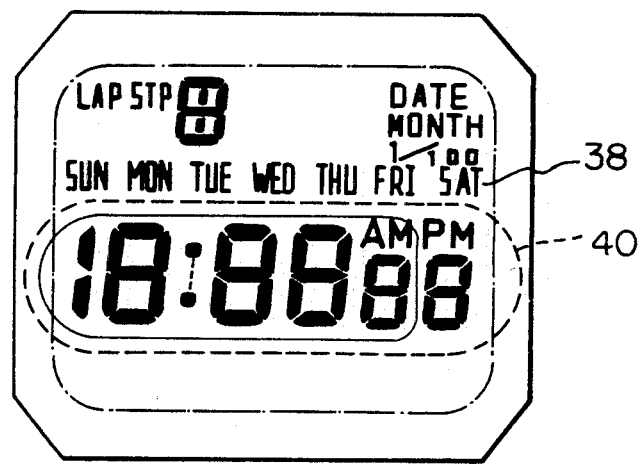
FIGS. 4A and 4B, and 5A and 5B are plan views of examples of display patterns produced by two different two-layer display cells, applicable to the prior art example shown in FIG. 3 and also to an embodiment of the present invention.
Figure 4B:
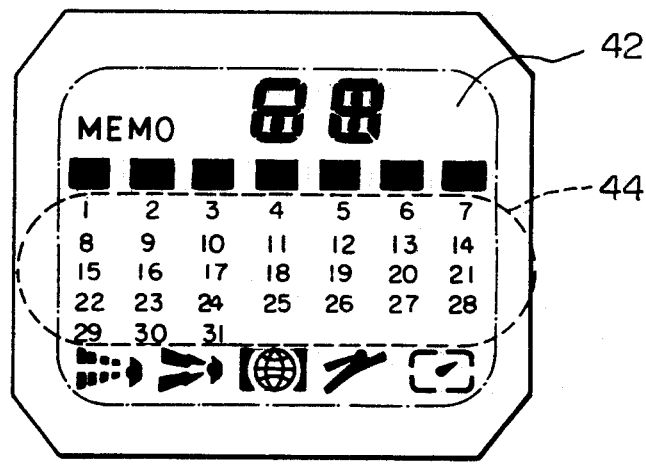

FIGS. 4A and 4B illustrate two sets of display patterns which can be provided by a two-layer liquid crystal display cell, such as a conventional type of cell as in FIG. 3 or by a display cell according to the present invention. The patterns shown in FIG. 4A can be produced by one layer of the display cell, while the patterns shown in FIG. 4B can be produced by the other layer of the cell. It will be apparent that the display pattern for displaying the current time, denoted by numeral 40 in FIG. 4A, cannot be displayed simultaneously with the display pattern for the calendar display, denoted by numeral 44 in FIG. 4B, since these display patterns overlap one another. However in this example, it is possible for portions of the remaining display patterns provided by each layer of the display cell to be activated simultaneously.

Figure 5A:
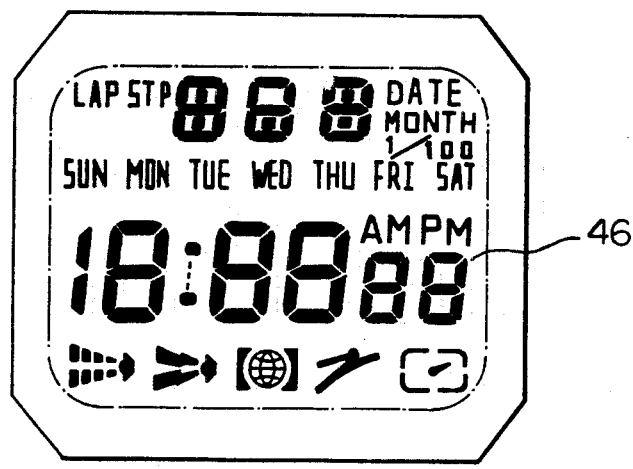
Figure 5B:
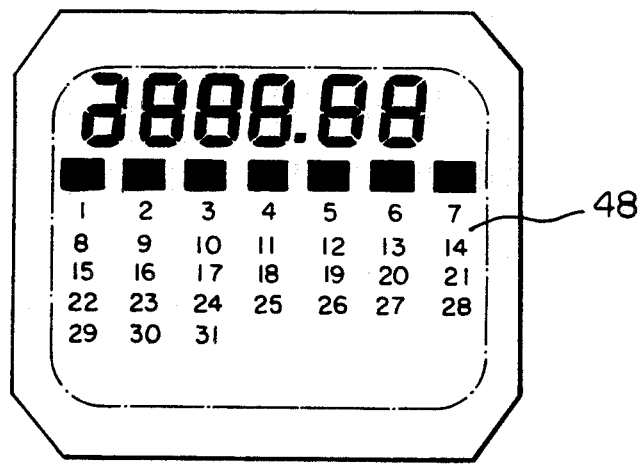

FIGS. 5A and 5B show another example of the display patterns which can be provided by a two-layer type of liquid crystal display cell, with the patterns shown in FIG. 5A being produced by one layer of the display cell and those of FIG. 5B by the other layer of the cell. In this case, it will be apparent that it is not possible to display the patterns of FIG. 5A and FIG. 5B simultaneously.

For a two-layer liquid crystal display cell to provide the display patterns of FIGS. 4A and 4B, it is necessary to provide a total of 117 display segments. For the example of FIGS. 5A and 5B, a total of 160 display segments must be provided. If the displays of FIGS. 4A and 4B were implemented by using a two-layer liquid crystal display cell of conventional type, such as that of FIG. 3, with time-sharing driving of two common electrodes in each layer (i.e. N=2), then the number of drive terminals required for the cell is 61. For the displays of FIGS. 5A and 5B, a total of 82 drive terminals would be required. Each of these drive terminals must be connected to one terminal of a drive signal source, which is usually a large-scale integrated circuit (usually abbreviated to LSI). In the current state of technology, taking into account the connections which must also be made to such an LSI for switches, quartz crystal vibrator, etc., there would be insufficient terminals available on a single LSI chip to implement a display such as that of FIG. 4A and 4B, so that it would be necessary to use at least two such LSI chips in such a case. This would cause an increase in cost of the apparatus containing the display, and result in an increase in overall size of the apparatus. In the case of a display device for an electronic wristwatch, such considerations are extremely serious. If the number of common electrodes were to be increased, for example to 4, then the number of drive terminals required for the display device would be reduced to 34, for the example of FIGS. 4A and 4B, and to 44 for the example of FIGS. 5A and 5B. However, in this case the reduction in the number of drive terminals would be accompanied by a deterioration of display effectiveness, for the reasons explained hereinabove. It can thus be seen that a conventional type of liquid crystal display cell of multi-layer type cannot provide a sufficient reduction in the number of drive terminal connections necessary, when the density of display segments is high.

Figure 7:
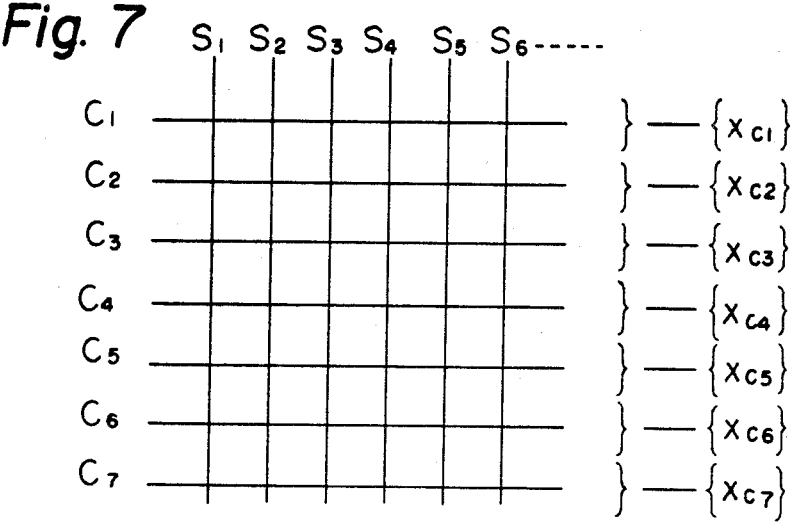
FIG. 7 is a diagram illustrating an electrode array according to the present invention.

An embodiment of the present invention will now be described which can provide the display patterns shown in FIGS. 4A and 4B. This embodiment provides a display effectiveness equivalent to that of a conventional type of multi-layer display cell such as that of FIG. 3 which utilizes 2 or 3 common electrodes in each layer, but uses only as many drive terminals overall as would be required for a conventional multi-layer display cell using 4 common electrodes in each layer. Before giving a detailed description of the embodiment of the present invention, some discussion of the basic concepts of such a display cell will be given. In a multi-layer display device, it is frequently necessary to provide groups of display segments in two or more of the layers which mutually overlap, and to arrange that only one of such overlapping groups of segments is activated at a time. This applies to overlapping display patterns which must not be activated simultaneously, the patterns being provided on different layers of the multi-layer display device. In the prior art, such groups of display segments are provided with independent sets of segment drive terminals. However, with the present invention, such sets of display segments are driven from sets of segment electrodes which are connected in common, as described hereinafter, while the display segment group which is not currently required to be activated is held in a non-activated condition by means of a special drive signal applied to the common terminal of that segment group. This is illustrated by the display matrix diagram of FIG. 7. According to the present invention, it is possible to arrange that only one of the display segment groups Xc1, Xc2 . . . Xc7 is activated, at any one time, by application of drive signals to the common electrodes C1 to C7 of the other display segment groups such that these segment groups cannot be activated, irrespective of the segment drive signals applied to the segment electrodes S1, S2 . . . S6 . . . If the number of common electrodes corresponding to non-activated display segments is designated as q, and the total number of common elctrodes as p, then if a special drive signal is applied to the q common electrodes whereby the corresponding display segments are held in the non-activated state, it becomes necessary to only apply time-shared drive signals to a number of common electrodes equal to (p−q). With a conventional type of display system, which does not take account of the fact that some display segment groups will not be activated simultaneously, it would be necessary to provide a number of common electrode time-shared drive signals p. In such a case, the present invention provides a display effectiveness equivalent to that of a display device of conventional type having (p−q) common electrodes, but having a number of drive terminals equivalent to that of a conventional type of display device having p common electrodes.

Figure 8A:
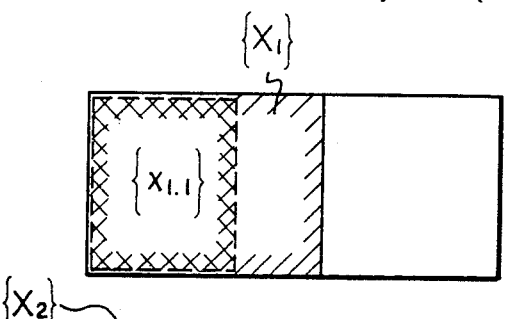
FIGS. 8A, 8B and 8C are diagrams useful in describing the principles of arrangement of common electrodes in a display device according to the present invention.
Figure 8B:
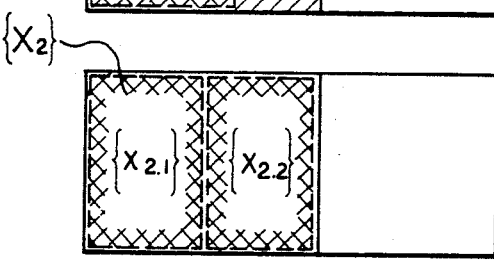
Figure 8C:
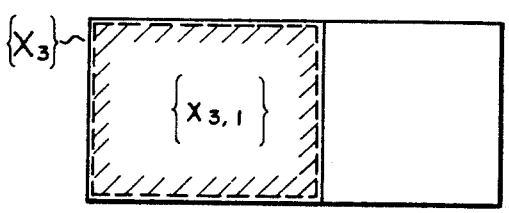

The basic concepts of the present invention will be further described with reference to the set diagrams of FIGS. 8A, 8B and 8C. In FIG. 8A, the large hatched area designated as $X_1$ denotes a set of display segments on one layer of a multi-layer display device. Such a segment set may contain a sub-set of display segments which must not be activated simultaneously with a segment set or segment sub-set on another layer of the device. The set $\{X_1\}$ of FIG. 8A contains a cross-hatched area, representing a segment sub-set $X_{1,1}$ while a set of segments $\{X_2\}$ in FIG. 8B contains two sub-sets $\{X_{2,1}\}$ and $\{X_{2,2}\}$. A segment set $\{X_3\}$ shown in FIG. 8C contains only a single sub-set, $\{X_{3,1}\}$. In the example of FIG. 4A, the overall display surface of one layer of the display device may considered as a set of display segments, denoted by numeral 38, which contains a segment sub-set 40. Here, display area 38 can be thought of as comprising a segment set such as $\{X_1\}$ of FIG. 8A while area 40 corresponds to sub-set $\{X_{1,1}\}$. The other layer of the display device contains a display area 42, which may be activated simultaneously with area 38, and so can be considered to correspond to segment sub-set $\{X_{2,2}\}$ of FIG. 8B, while display area 44, whose display segments cannot be activated simultaneously with area 40, can be considered to correspond to segment sub-set $\{X_{2,1}\}$ of FIG. 8B.

Figure 6A:
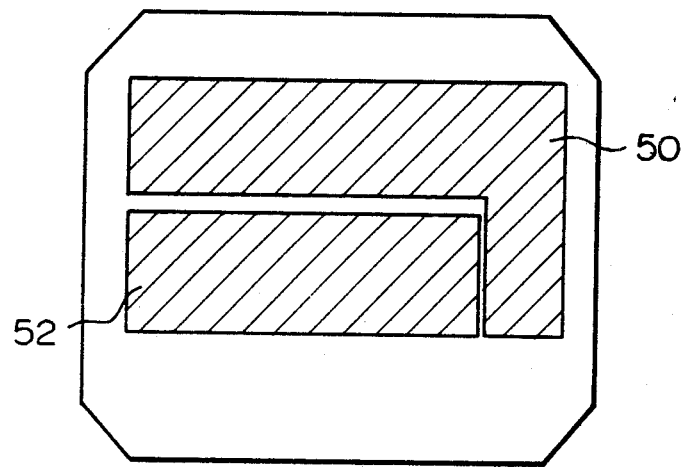
FIGS. 6A and 6B are plan views illustrating the configuration of common electrodes of an embodiment of a two-layer liquid crystal display cell according to the present invention, applicable to the display patterns of FIGS. 4A and 4B.
Figure 6B:
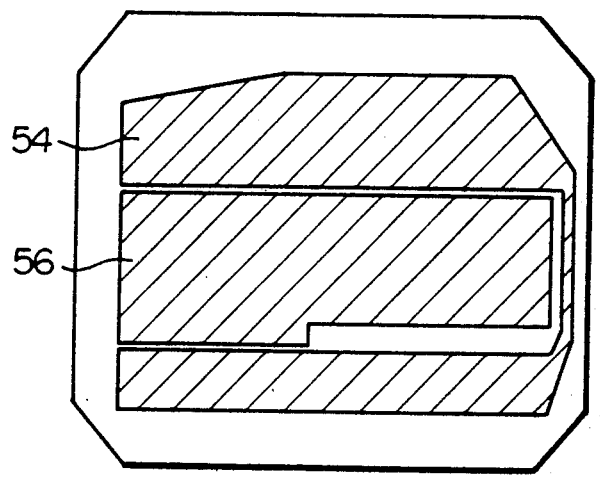

A suitable arrangment of common electrodes for an embodiment of the present invention to provide the displays of FIGS. 4A and 4B is shown in FIGS. 6A and 6B. A pair of common electrodes 50 and 52 are provided on one layer of the two-layer display device, to provide the display patterns 38 and 40 respectively, while another pair of common electrodes 54 and 56 are provided on another layer of the display device to provide the display patterns 42 and 44 respectively, of FIG. 4B.

Figure 9:
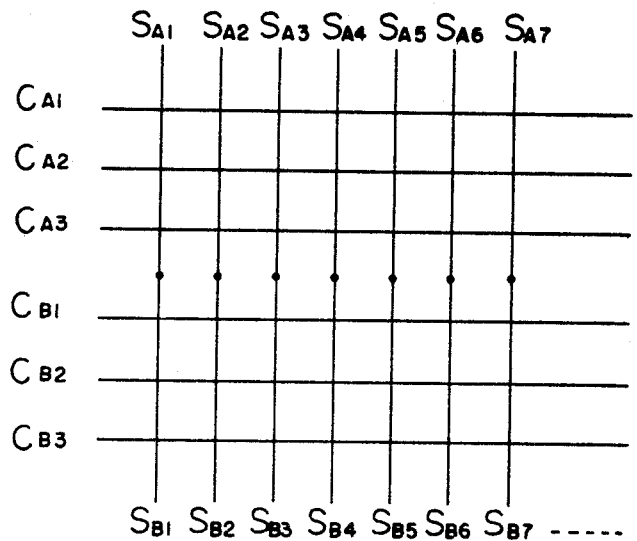
FIG. 9 and FIG. 10 are diagrams illustrating examples of display cell electrode array configurations according to the prior art and according to the present invention respectively.
Figure 10:
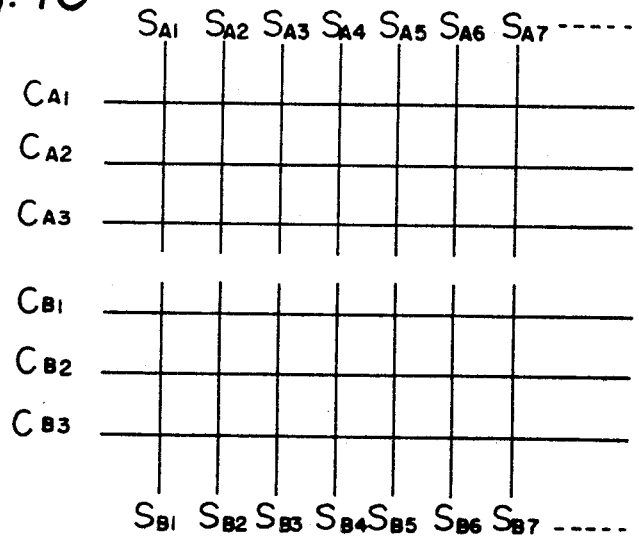

The manner of arranging the segment electrodes of a display device according to the present invention will now be described. It is a feature of the present invention that at least some of the segment electrodes of one layer in a multi-layer display device are connected to at least some of the segment electrodes of at least one other layer of the device. The basic difference between a multi-layer display device according to the present invention and a prior art device is illustrated by FIGS. 9 and 10. FIG. 9 shows the display electrode configuration for a prior art type of multilayer display device. Here, segment electrodes $S_{A1}$ . . . $S_{A7}$ and common electrodes $C_{A1}$, $C_{A2}$ and $C_{A3}$ are provided on one layer of the display device, while segment electrodes $S_{B1}$ . . . $S_{B7}$ and common electrodes $C_{B1}$ to $C_{B3}$ are provided on a second layer of the device. Here, even if groups of display segments on one layer must not be activated with an overlapping group of display segments on the other layer, it is still necessary to provide separate segment electrodes for the display segments of each layer. FIG. 10 shows a possible arrangement of segment electrodes for an embodiment of the present invention. Here, it is assumed that some of the display segments corresponding to the intersections of common electrodes $C_{A1}$ to $C_{A3}$ with the segment electrodes will never be activated simultaneously with at least some of the display segments defined by the intersections of common electrodes $C_{B1}$ to $C_{B3}$ with the segment electrodes. Thus, segment electrodes $S_{A1}$ and $S_{B1}$ are connected in common, as are also electrodes $S_{A2}$ and $S_{B2}$, and so on, as shown in FIG. 10. To prevent simultaneous activation of two groups of segments simultaneously, when this is prohibited, a special signal is applied to the common electrode (or electrodes) of the segment group which is not currently required to be displayed. For this example, three common electrodes are provided in each layer of the display device, but this number of common electrodes may be greater or less, depending upon the particular device.

Figures 11, 12A:
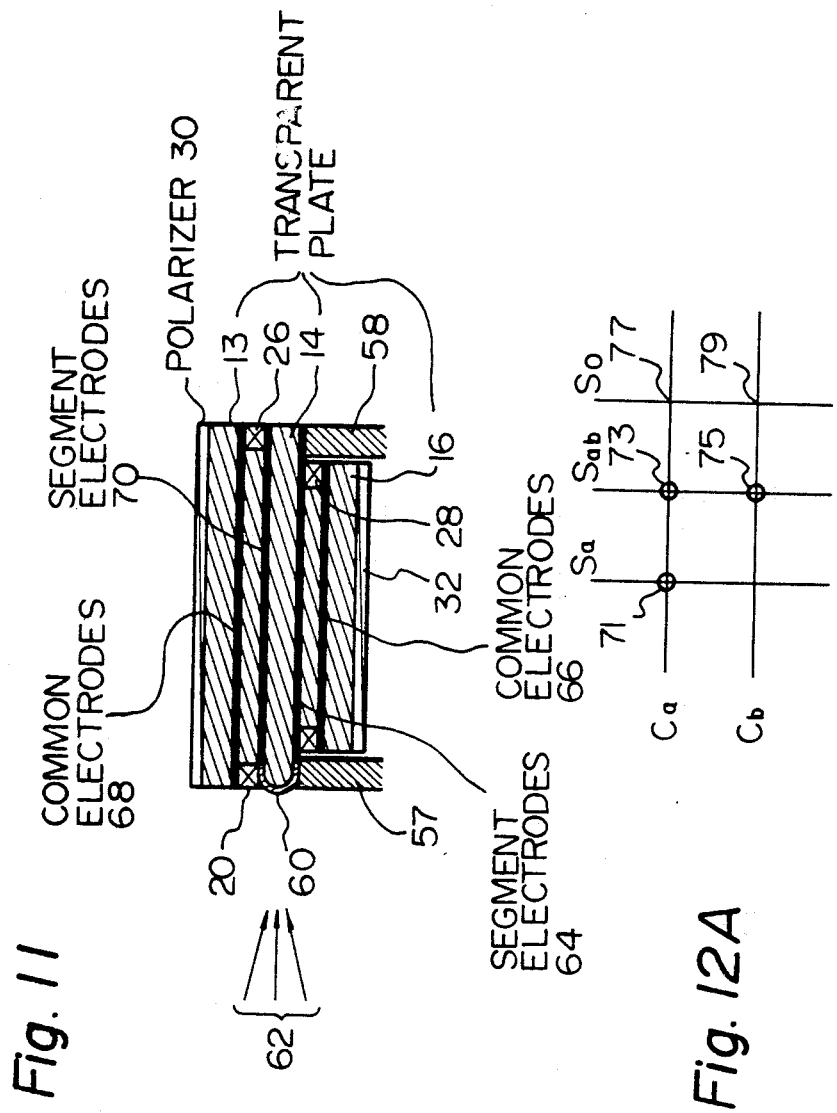
FIG. 11 is a cross-sectional view in elevation of a two-layer liquid crystal cell according to the present invention.
FIGS. 12A and 12B are a display element activation state diagram and a timing diagram respectively, useful in describing the principles of operation of a time-sharing drive system for a liquid crystal display device according to the prior art.

Referring now to FIG. 11, a cross-sectional view in elevation is shown therein of an embodiment of a two-layer liquid crystal display cell according to the present invention. Components having identical functions to those of the prior art example of FIG. 3 are designated by identical reference numerals to those of FIG. 3. Numerals 64 and 70 denote sets of segment electrodes, formed on the lower and upper surfaces respectively of transparent plate 14. Numeral 68 denotes a set of common electrodes formed on the lower surface of transparent plate 13, and numeral 66 denotes a set of common electrodes formed on the upper surface of transparent plate 16. Connections between the electrodes and an external source of drive signals are established by means of conductive rubber strips, denoted by numerals 57 and 58. At least some of the segment electrodes of the upper layer of the device are connected to segment electrodes of the lower layer, by means of a metallic wiring pattern 60, which is formed by evaporative deposition of a metal from the direction indicated by the arrows 62. A suitable mask is used in this evaporative deposition process.

As stated hereinabove, groups of display segments which overlap, in the two layers of the device of FIG. 11, and which are not required to be activated simultaneously, have their segment electrodes connected together, in the manner described above with reference to FIG. 10. Each of these groups of display segments is also provided with an individual common electrode, such as the common electrodes shown in the example of FIGS. 6A and 6B. Such interconnection of segment electrodes of different layers can be accomplished by simple means such as that of the embodiment of FIG. 11, and each of the pairs of segment electrodes thus interconnected can be connected by a single lead on a wiring pattern to the integrated circuit producing the segment drive signals.

Figure 12B:
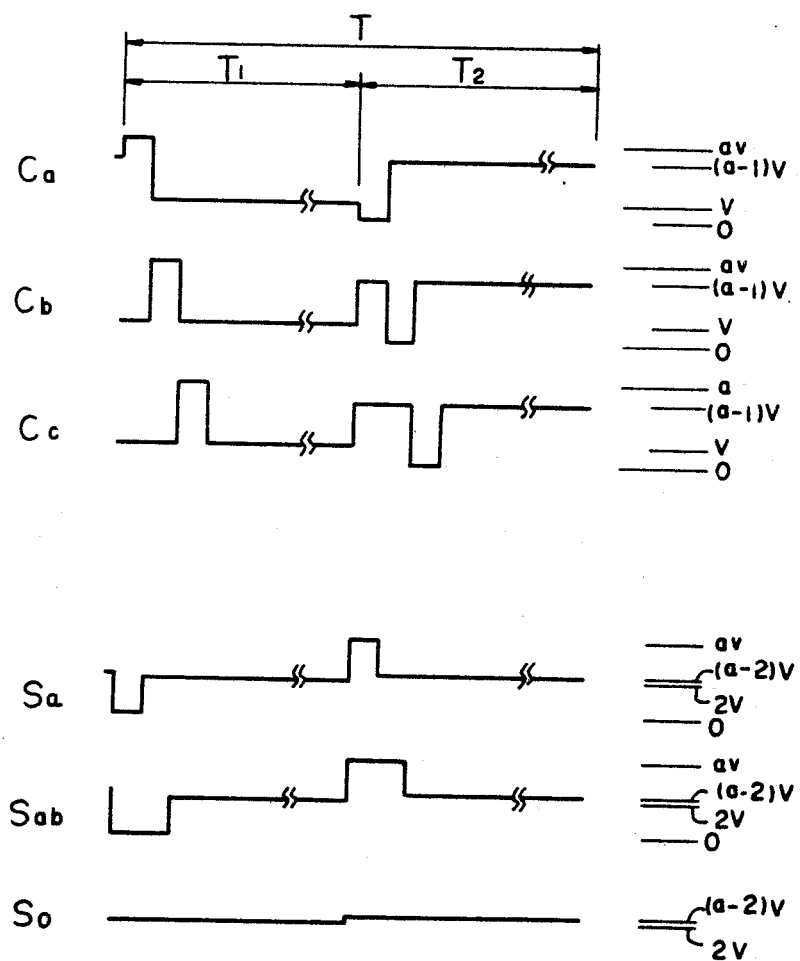

Before describing specific methods of driving a display device according to the present invention, the methods of applying time-sharing drive signals to a display will first be discussed, with reference to FIGS. 12A and 12B. Drive pulses, denotes as Ca, Cb, Cc are successively applied to common electrodes of a display electrode matrix, as shown in FIG. 12B. Depending upon the potential level of a segment electrode at the time of application of a drive signal to a common electrode, the display segment at the intersection of that segment electrode and common electrode will either be activated or non-activated during the common electrode drive signal pulse. This is illustrated by the activation state diagram of FIG. 12A. Here, for the segment electrode $S_a$, only display segment 71 is to be activated, for segment electrode $S_{ab}$, both display segments 73 and 75 are to be activated, and for segment electrode $S_O$, neither of the display segments 77 and 79 is to be activated. In the case of a liquid crystal display cell, it is necessary to apply drive voltages across the electrodes of each display segment of alternating polarity. Thus, during a time interval $T_1$, as shown in FIG. 12B, a voltage of one polarity is applied to activate a display segment, while during a succeeding time interval $T_2$, a voltage of opposite polarity is applied to activate that display segment. A time interval such as $T_1$ or $T_2$ will be referred to in the present specification and claims as a scan period. During the scan period $T_1$, the drive voltage level applied to a common electrode is at a level $aV$ during a predetermined selection interval, and at a level $V$ during the remainder of that scan period. The potential $aV$ will be referred to as the selection voltage level for the scan period $T_1$, since during this time the display segments corresponding to that common electrode can be activated. The voltage level V is referred to as the non-selection voltage level. During the succeeding scan period $T_2$, the selection voltage level and the non-selection voltage level are 0 and $(a-1)V$ respectively. It is possible to use the same potential level for the non-selection voltage level during both the time intervals $T_1$ and $T_2$, however for reasons of reduction of supply voltage requirements, a different value is often used as in this example. The actual drive voltage waveforms applied to the segment electrodes will vary depending upon the pattern to be displayed. In this example, the segment electrode waveforms correspond to the activation states shown in FIG. 12A. To activate a display segment, in this example, it is necessary to apply a voltage $aV$ between the segment electrode and common electrode of that display segment. Thus, the display segment 71 in FIG. 12A will be activated by the segment drive signal $S_a$ applied thereto, the displays segments 73 and 75 will be activated by the segment drive signal $S_{ab}$ applied thereto, and the display segments 77 and 79 will not be activated, since a signal $S_0$ at the potential levels $2V$ and $(a-2)V$ is applied thereto.

Figures 13, 14:
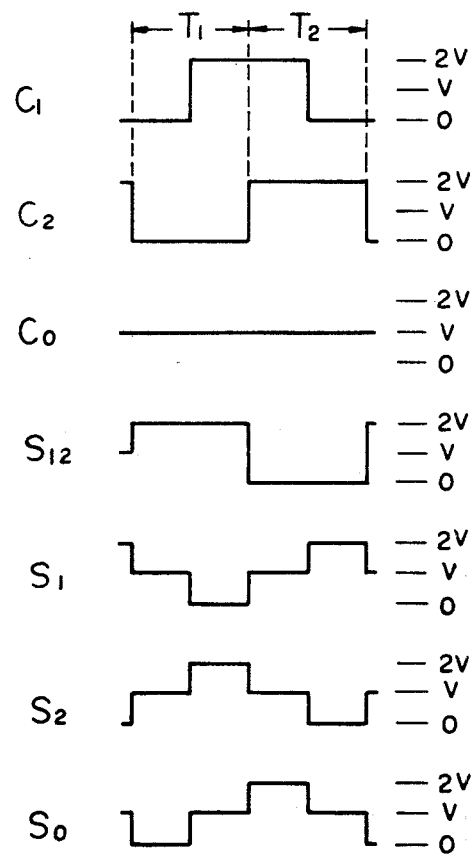
FIG. 13 is a waveform diagram illustrating a common electrode drive signal used in a display system according to the present invention, whereby a set of display segments are selectively enabled and disenabled to be activated.
FIG. 14 is a waveform diagram illustrating the electrode drive signal waveforms for a display device according to the present invention, corresponding to the diagram of FIG. 14.

In a conventional display device, if the number of common electrodes is N, then a total of $2^N$ segment drive signals are required, to enable selective actuation of all display segments. With the present invention, however, the number of segment drive signals is reduced, in the case of groups of display segments which are not to be activated simultaneously. This is achieved by means of a special common electrode drive signal, an example of which, applicable to the display drive waveforms of FIG. 12B, is shown in FIG. 13. This is not a time-sharing signal, but remains at the non-selection voltage level V during the scan period $T_1$, and at the non-selection voltage level $(a-1)V$ during the succeeding scan period $T_2$. By applying the drive signal of FIG. 13 to a common electrode, it is ensured that none of the display segments of that common electrode can be activated, irrespective of the drive signals applied to the segment electrodes of these display segments.

FIG. 14 shows an example of drive waveforms for a display system having display patterns as shown in FIGS. 5A and 5B, and having two or three common electrodes, and in which the non-selection voltage level has the same value, V during both the scan periods $T_1$ and $T_2$. Thus, in this case it is possible to use a fixed potential V as the non-activation signal $C_0$ applied to a common electrode, to ensure that none of the display segments of that common electrode can be activated.

Figure 15B:
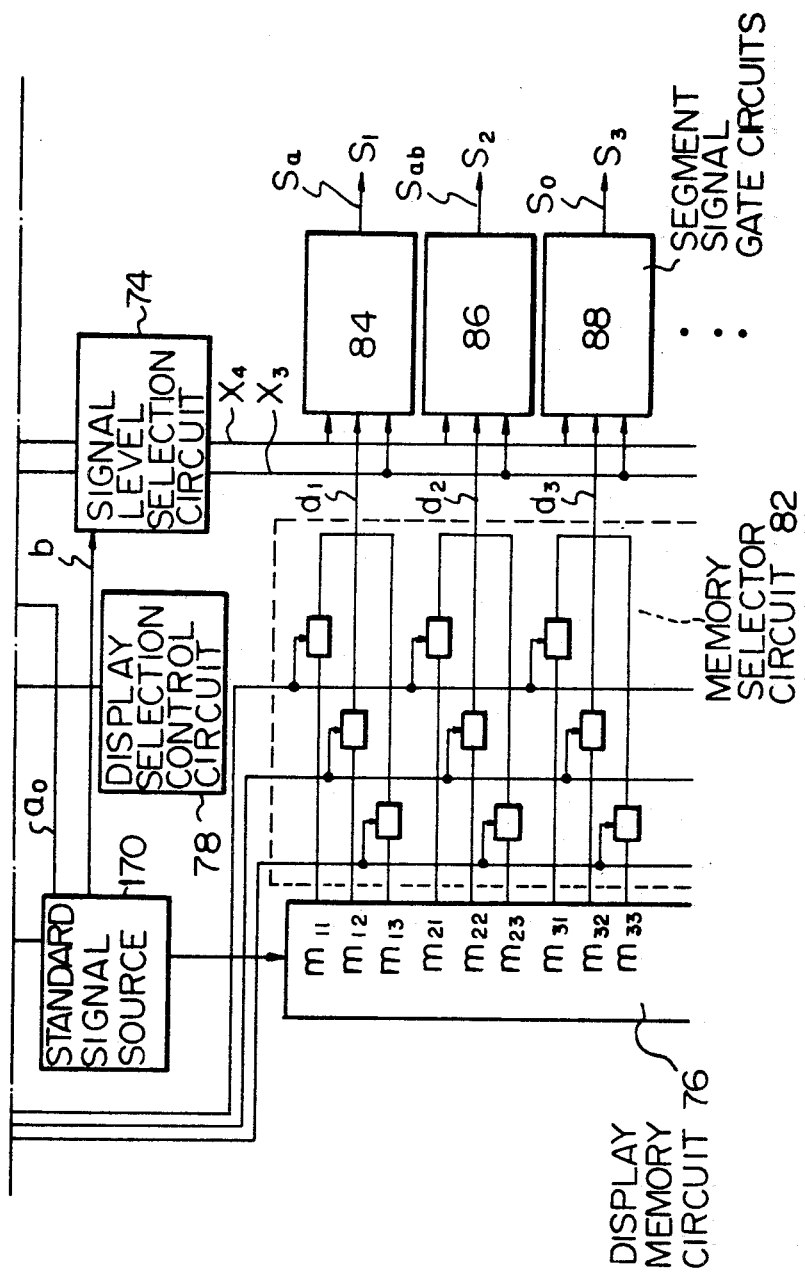
FIG. 15 is a partial block circuit diagram of a drive signal generation system according to the present invention, applicable to a two-layer liquid crystal display device such as the embodiment of FIGS. 4A and 4B.
Figure 18:
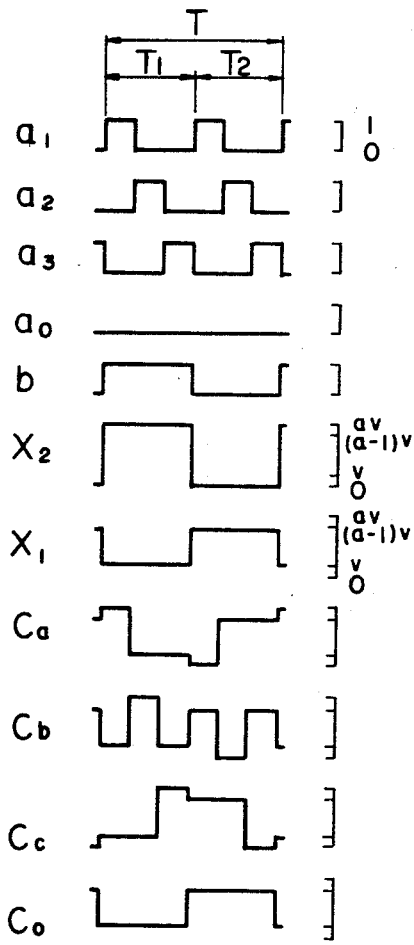
FIG. 18 is a waveform diagram illustrating the common electrode drive signal waveforms for the system of FIG. 15.

FIG. 15 shows an embodiment of a drive signal generation system according to the present invention, which is applicable to a two-layer liquid crystal display cell according to the present invention having two common electrodes on each layer thereof, as shown in FIGS. 6A and 6B, for producing display patterns as shown in FIGS. 4A and 4B. As explained hereinabove, the display patterns corresponding to common electrodes 52 and 56 are mutually exclusive, i.e. only one of these patterns can be activated at a time. The display patterns corresponding to common electrodes 50 and 54 of FIGS. 6A and 6B, on the other hand are not mutually exclusive, so that the display segments of the latter common electrodes must be driven independently. The segment electrodes of the display segments corresponding to common electrodes 52 and 56, however, can be connected together according to the method of the present invention, as shown in FIG. 10. Referring to FIGS. 15A and B, reference numeral 170 denotes a standard frequency signal source, which produces various timing signals, and comprises a standard frequency oscillator, frequency dividers, etc. In response to one of these timing signals, a shift register circuit 72 produces signals $a_1$, $a_2$ and $a_3$ having the waveforms shown in the waveform diagram of FIG. 18. These signals are applied to a memory selector circuit 82 and a set of common signal gate circuits 90, 92, 94 and 96, and serve to define the basic time-sharing operation of the drive signal generation system. A signal level selection circuit 74 produces signals $X_1$ and $X_2$ which determine the potential levels of a set of common electrode drive signals produced by common signal gate circuits 90, 92, 94 and 96, these common electrode drive signals being applied to a set of drive terminals C1, C2, C3 and C4, which are connected to common electrodes 50, 54, 52 and 56 respectively of FIGS. 6A and 6B. Numeral 80 denotes a display selection circuit, which is a unique feature of the present invention. Output signals from display selection circuit 80 are applied to gate circuits 94 and 96, to control either of the sets of display setments corresponding to common electrodes 52 and 56 to be held in the non-activated state. The drive signal applied to common electrode 50 is denoted as Ca, and that applied to common electrode 52 as Cb. If the display segments of common electrode 52 are to be enabled to be activated, then signal $a_3$ is applied by display selection circuit 80 to gate circuit 94, so that a drive signal Cc is produced thereby, having the waveform shown in FIG. 19. If the display segments corresponding to common electrode 52 are to be held in the non-activated state, and those of common electrode 56 are to be enabled for activation, then a signal $a_0$, i.e. a low logic level potential, is applied to gate circuit 94, so that a signal $C_0$ is applied thereby to common electrode 56, while the signal Cc is applied to common electrode 56. The operation of display selection gate circuit 80 is controlled by a display selection control circuit 78, which produces a control signal to determine whether the display segments of common electrode 52 or of common electrode 56 are to be held non-activated.

Numeral 76 denotes a display memory circuit, which stores data specifying the display patterns. Data from a number of sets of memory locations, e.g. $m_{11}$, $m_{22}$ and $m_{22}$ are selected by means of a memory selector circuit 82, in synchronism with the common electrode drive signals Ca, Cb and Cc, and are applied to a set of segment signal gate circuits 84, 86, 88, etc., wherein signal potential level setting is performed in response to output signals $X_3$ and $X_4$ from signal level selection circuit 74.

Figures 16, 17:
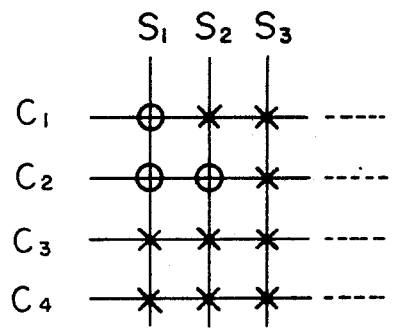
FIG. 16 is a diagram illustrating a display element activation condition assumed to result from the drive signals of the system of FIG. 15.
FIG. 17 is a diagram illustrating the contents of a display memory in the drive system of FIG. 15, corresponding to the display element activation states shown in FIG. 16.
Figure 19:
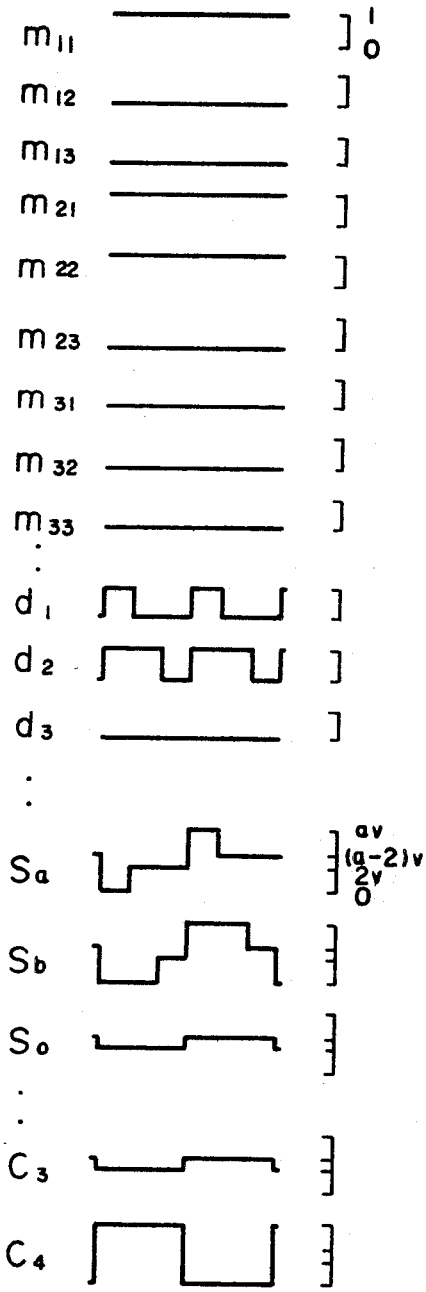
FIG. 19 is a waveform diagram illustrating the segment drive signals which correspond to the memory contents shown in FIG. 17.

The waveform diagram of FIG. 19 shows an example of the contents of display memory circuit 76, and the corresponding output signals $d_1$, $d_2$, $d_3$ produced by memory selector circuit 82, together with the corresponding segment drive signals Sa, Sab and $S_0$ which are applied to segment drive terminals $S_1$, $S_2$ and $S_3$ respectively. The corresponding relationship between the display memory contents, shown in matrix array form in FIG. 17, is illustrated by FIG. 16, which indicates that the display segment corresponding to a high logic level display memory circuit output, such as $m_{11}$ is activated, while a display segment corresponding to a low logic level display memory circuit output, such as $m_{21}$, is not activated.

Signal level selection circuit 74 produces output signals at six different voltage levels, namely v, 2v, 0, $(a-1)v$, $(a-2)V$ and av. Two of these voltage levels are selected, during each scan period $T_1$ and $T_2$, to form the common electrode drive signals Ca, Cb and Cc. The non-activation common electrode drive signal $C_0$ remains at the av potential level during scan period $T_1$, and at the $(a-1)v$ potential level during the succeeding scan period $T_2$.

Thus, by selective application of signals Cc and $C_0$ to common electrodes 52 and 56, under the control of the display selection control circuit 78, either the display pattern 40 of FIG. 4A or the display pattern 44 of FIG. 4B can be made visible, but both display patterns cannot be activated at the same time. In this way, the segment electrodes of these display patterns can be connected in common, in the manner shown in FIG. 10, thereby reducing the total number of drive terminals required for the display device.

From the above description, it can be appreciated that a multi-layer display device according to the present invention can provide a significant reduction in the number of connections which must be made to the display device from an external drive signal source such as a large-scale integrated circuit, and thereby enables a greater display density and greater variety of display patterns to be produced thereby. The basic features of importance of the present invention are that the segment electrodes of groups of display segments which must not be activated simultaneously are connected in common, and that a separate common electrode is provided for each of such groups of display segments, with a special common segment drive signal being applied to the common segment of the display segment group which is not currently required to be activated.

It will of course be apparent that the present invention is equally applicable to a singlelayer type of display cell in which certain groups of display segments will never be activated simultaneously. However such a condition is most frequently met with in a multi-layer type of display device.

Although the present invention has been shown and described with respect to specific embodiments, various changes and modifications to the construction thereof may be made, without departing from the spirit and scope of the present invention, and all matter contained in the above description of shown in the accompanying drawings is intended to be interpreted in an illustrative and not in a limiting sense. The appended claims are intended to cover all of the generic and specific features of the invention described hereinabove.

What is claimed is:

1. In a multi-layer liquid crystal display device for displaying a plurality of display patterns each comprising a group of display segments, each of said display segment groups consisting of a common electrode and a plurality of segment electrodes provided in a single layer of said multi-layer display device, the improvement comprising:
    electrically connecting the segment electrodes of a first group of display patterns to the segment electrodes of a second group of display patterns, said first group of display patterns being actuated when said second group of display patterns is deactivated, and said first group of display patterns being deactivated when said second group of display patterns is activated.

2. In a multi-layer liquid crystal display device in accordance with claim 1 further including a first drive signal means and a second drive signal means for driving the multi-layer liquid crystal display device, said first drive signal means applied to the common electrode of one group of display patterns, and said second drive signal means applied to said segment electrodes of said first and second group of display patterns, whereby said segment electrodes electrically connected to said common electrode driven by said first drive signal means will remain inhibited irrespective of the potential applied across said segment electrodes by said second drive signal means.

3. In a multi-layer liquid crystal display device in accordance with claim 2 further including a common electrode connected to each display pattern, each display pattern comprising a group of display segments provided in each layer of said multi-layer liquid crystal display device and further including a third drive signal means for providing time-sharing drive signals to all of said common electrodes to which said first drive signal means is not applied.

4. In a multi-layer liquid crystal display device in accordance with claim 3 wherein each of said time-shared drive signals produced by said third drive signal means applied across a common electrode produces a selection voltage level during a predetermined selection interval within each of a succession of scan periods, and produces a nonselection voltage level during the remainder of each of said scan periods, and wherein said first drive signal means produces a nonactivation voltage level during at least a time interval corresponding to said selection interval in each of said scan periods.

5. In a multi-layer electrochromic display device for displaying a plurality of display patterns each comprising a group of display segments, each of said display segment groups consisting of a common electrode and a plurality of segment electrodes provided in a single layer of said multi-layer display device, the improvement comprising:
electrically connecting the segment electrodes of a first group of display patterns to the segment electrodes of a second group of display patterns, said first group of display patterns being actuated when said second group of display patterns is deactivated, and said first group of display patterns being deactivated when said second group of display patterns is activated.

6. In a multi-layer electrochromic display device in accordance with claim 5 further including a first drive signal means and a second drive signal means for driving the multi-layer electrochormic display device, said first drive signal means applied to the common electrode of one group of display patterns, and said second drive signal means applied to said segment electrodes of said first and second group of display patterns, whereby said segment electrodes electrically connected to said common electrode driven by said first drive signal means will remain inhibited irrespective of the potential applied across said segment electrodes by said second drive signal means.

7. In a multi-layer electrochromic display device in accordance with claim 6 further including a common electrode connected to each display pattern, each display pattern comprising a group of display segments provided in each layer of said multi-layer electrochromic display device and further including a third drive signal means for providing time-shared drive signals across all of said common electrodes to which said first drive signal means is not applied.

8. In a multi-layer electrochromic display device in accordance with claim 7 wherein each of said time-shared drive signals produced by said third drive signal means applied across a common electrode produces a selection voltage level during a predetermined selection interval within each of a succession of scan periods, and produces a nonselection voltage level during the remainder of each of said scan periods, and wherein said first drive signal means produces a non-activation voltage level during at least a time interval corresponding to said selection interval in each of said scan periods.

9. A multi-layer liquid crystal display device, comprising:
first, second and third transparent plates;
a first layer of liquid crystal disposed between said first and second transparent plates;
a second layer of liquid crystal disposed between said second and third transparent plates;
sealing means for sealing said first and second layers of liquid crystal material;
a first plurality of transparent common electrodes formed on an inner surface of said first transparent plate;
a second plurality of common electrodes formed on an inner surface of said third transparent plate;
a first plurality of segment electrodes formed on a surface of said second transparent plate opposite said first plurality of common electrodes;
a second plurality of segment electrodes formed on a surface of said second transparent plate opposite said second plurality of common electrodes; and
a plurality of connecting leads formed on an external surface of second transparent plate for electrically connecting at least a portion of said first plurality of segment electrodes to at least a portion of said second plurality of segment electrodes,
wherein said at least a portion of said first plurality of segment electrodes are never activated during activation of at least a portion of said second plurality of segment electrodes.

10. A multi-layer liquid crystal display device in accordance with claim 9 further including:
first drive signal means electrically connected to said first and second plurality of common electrodes, said first drive signal means applying a non-activation signal across either said first or second plurality of common electrodes; and
second drive signal means electrically applied across said first and second plurality of segment electrodes;
whereby said segment electrodes electrically applied across said common electrode driven by said first drive signal means will remain inhibited irrespective of the potential applied across said segment electrodes by said second drive signal means.

11. A multi-layer liquid crystal display device in accordance with claim 10 further including:
third drive signal means electrically applied across said common electrodes for providing time-shared drive signals across all of said common electrodes to which said first drive signal means is not applied.

12. A multi-layer liquid crystal display device in accordance with claim 9 wherein said plurality of connecting leads formed on said second transparent plate comprise metallic leads formed by evaporative deposition of a metallic substance upon said second transparent plate.

13. A multi-layer liquid crystal display device in accordance with claim 9, and further comprising a plurality of electrically conductive strips of a flexible material provided external to said display device for establishing electrical connection to each of said connecting leads formed on said external surface of said second transparent plate.

* * * * *